(12) United States Patent
Pourmand et al.

(10) Patent No.: US 6,227,271 B1
(45) Date of Patent: May 8, 2001

(54) FLATBED LAMINATION MACHINE

(75) Inventors: Nasser Pourmand, Encino; John James Boyer, Yorba Linda, both of CA (US)

(73) Assignee: Textile Systems & Supply, Inc., Los Angeles, CA (US)

( * ) Notice: Subject to any disclaimer, the term of this patent is extended or adjusted under 35 U.S.C. 154(b) by 0 days.

(21) Appl. No.: 09/404,239

(22) Filed: Sep. 23, 1999

(51) Int. Cl.[7] .............................. B30B 5/06; B30B 15/34
(52) U.S. Cl. ................ 156/498; 156/555; 156/583.5; 100/154; 100/310; 100/312
(58) Field of Search ..................... 156/498, 555, 156/580, 582, 583.1, 583.5; 100/154, 309, 310, 311, 312; 425/371

(56) References Cited

U.S. PATENT DOCUMENTS

| | | | |
|---|---|---|---|
| 3,367,261 | * 2/1968 | Kashiwagi | 100/93 |
| 4,080,241 | * 3/1978 | Grevich et al. | 156/498 |
| 4,362,593 | * 12/1982 | Grevich | 156/498 |
| 4,645,559 | 2/1987 | Kaiser et al. | 156/583.1 |
| 4,721,542 | 1/1988 | Schaublin | 156/353 |
| 4,728,385 | 3/1988 | Hell | 156/353 |
| 4,897,147 | 1/1990 | Inselmann | 156/498 |
| 4,997,507 | * 3/1991 | Meyer | 156/286 |
| 5,261,997 | 11/1993 | Inselmann | 156/580 |
| 5,310,443 | * 5/1994 | Burger | 156/466 |
| 5,501,764 | 3/1996 | Inselmann | 156/580 |
| 5,505,813 | * 4/1996 | Scheifele et al. | 156/380.1 |

OTHER PUBLICATIONS

Kannegiesser; "Quality Fusing for Quality Fabrics"; 6 pages.

Brandwise Reliant Limited; "Powerbond High Performance Laminating Technology"; 8 pages.

Meyer; "Laminating Stabilizing Calibrating Coating"; 6 pages.

* cited by examiner

*Primary Examiner*—James Sells
(74) *Attorney, Agent, or Firm*—Stetina Brunda Garred & Brucker

(57) ABSTRACT

A lamination machine for adhesively heat laminating adjacent surfaces of two lengths of material to each other. The machine includes a flatbed pre-laminating station with upper and lower pre-lamination conveyor belts and banks of heater components immediately above and below. At least one pre-lamination belt is vertically movable to establish and adjust a gap between belts while its associated bank of heating elements is vertically pressuredly movable to thereby tightly maintain proximity of heater elements, belts, and laminate materials. Situated immediately downstream is a pressure roller independently vertically movable to establish and adjust laminate gap distance and, during lamination operation, tensioned against a lower conveyor belt guide roller and movable by a roller pressure driver toward the guide roller. A flatbed cooling station is situated downstream from the pressure roller and includes opposing cooling station conveyor belts separate from those of the pre-laminating station to form a cooling passage therebetween whose height is established and adjusted by independent vertical movement of at least one belt, while its associated bank of cooling elements is vertically pressuredly movable to thereby tightly maintain proximity of cooling components, belts, and laminate materials in the cooling station. The pre-lamination and cooling station conveyor belts remain flat during operation and thus do not experience air gap production above and below heating and cooling components and consequent production of temperature inconsistencies. Further, the pressure roller position restricts air gap production on either side thereof, thereby maximizing temperature consistency throughout pre-lamination and cooling.

6 Claims, 4 Drawing Sheets

FLATBED LAMINATION MACHINE

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

This invention relates in general to lamination equipment for adhesively heat laminating two or more lengths of material to each other to form a laminated product, and in particular, to a flat-bed lamination machine having individual heating and cooling zones each having dedicated tautly-maintained conveyor belt systems for moving material and having disposed between the zones a lamination pressure roller cooperatively aligned with a conveyor belt guide roller for laminate production.

BACKGROUND OF THE INVENTION

Lamination is an extremely important process in the production of a myriad of goods. Such lamination generally involves the bonding of adjacent surfaces of two or more lengths of different textile products to each other with heat-sensitive adhesive. The two lengths typically are fed into a lamination machine where both heat and physical pressure are applied to consequently activate the adhesive and retain the lengths together as a laminated product. Non-limiting examples of such laminated products include garments with backings, wadding, or decorative panels, carpets and draperies with backings and linings, furniture upholstery and bedding covers, and scores of other domestic and industrial commodities.

While lamination machines are known in the art, these machines provide a single conveyor belt system of two opposing rotating belts between which two lengths of material travel and are laminated by opposing pressured rollers after the lengths of material are heated during belt travel in a heating zone to a lamination temperature. After such lamination, the resulting laminated product is cooled and made available for final use. Because of travel distance from initial entrance in the conveyor belt system to final exit after cooling, the two opposing belts thereof have a tendency to sag while moving fabric lengths and resultantly cause air gaps between heating components and the undersides of adjacent belt sites. These air gaps interfere with heat delivery, and therefore heat regulation, in the heating zone and can result in inferior lamination of two lengths of material. It is therefore apparent that a need is present for a lamination machine where heat delivery and regulation is controlled. Accordingly, a primary object of the present invention is to provide a lamination machine in which the spatial relation between heating components and respectively adjacent conveyor belts is maintained to deliver generally standardized heat quantities along the entire length of a heating zone of the machine.

Another object of the present invention is to provide a lamination machine where a bank of upper heater components are positioned immediately above and in contact with the upper pre-lamination conveyor belt while a bank of lower heater components are positioned immediately below and in contact with the lower pre-lamination conveyor belt, with at least one of the banks being pneumatically pressure driven to be forced against the moving belts for non-air-gap belt position maintenance.

Still another object of the present invention is to provide a lamination machine having a pre-laminating station and a cooling station served by separate opposing upper and lower conveyor belts, with the pre-laminating station having the banks of heater components.

Yet another object of the present invention is to provide a lamination machine wherein a pressure drivable lamination roller resides between the pre-laminating station and the cooling station and is pressured against a guide roller serving the lower conveyor belt of the lamination station.

These and other objects of the present invention will become apparent throughout the description thereof which now follows.

BRIEF SUMMARY OF THE INVENTION

The present invention is a lamination machine for adhesively heat laminating adjacent surfaces of two lengths of material to each other. The machine comprises, first of all, a flatbed pre-laminating station comprising upper and lower continuous opposing pre-lamination conveyor belts disposed one above the other to form a lamination passage therebetween having an entrance through which two lengths of material can enter for continued travel through the lamination passage to a pre-laminating station exit. The upper conveyor belt of the pre-laminating station is independently vertically movable to thereby establish and adjust the height of gap between the upper and lower conveyor belts such that a wide range of thicknesses of materials to be laminated can be accommodated. A bank of upper heater components is positioned immediately above and in contact with the upper pre-lamination conveyor belt and a bank of lower heater components is positioned immediately below and in contact with the lower pre-lamination conveyor belt. The banks of heater components function to heat heat-sensitive adhesive disposed between two lengths of material when the lengths travel through the pre-laminating station, with at least one of the banks being pressuredly movable by a bank pressure driver toward the pre-lamination conveyor belts to thereby tightly maintain the belts spatially.

Situated immediately downstream from the pre-laminating station exit is a lamination pressure roller tensionable against a conveyor belt guide roller situated beneath the lower conveyor belt and in alignment with the lamination pressure roller. As with the upper conveyor belt of the pre-laminating station, the pressure roller is independently vertically movable to likewise adjust the height of the gap between it and the guide roller. The lamination pressure roller is also pressuredly movable against the guide roller to thereby accomplish lamination pressure on lengths of material traveling between the pressure and guide rollers. A flatbed cooling station is situated immediately downstream from the pressure roller and comprises upper and lower continuous opposing cooling station conveyor belts separate from those of the pre-laminating station and disposed one above the other to form a cooling passage therebetween having an entrance through which a laminated product can travel after emergence from beneath the pressure roller for continued travel to a cooling station exit. As with the upper conveyor belt of the pre-laminating station, the upper conveyor belt of the cooling station is likewise independently vertically movable to thereby establish and adjust the height of the gap between the upper and lower cooling station conveyor belts. Two respective banks of cooler components are positioned immediately above and immediately below the upper and lower cooling station conveyor belts for cooling a laminated product subsequent to lamination thereof when the product travels through the cooling zone. As with the heater component banks described above, at least one of the cooler component banks likewise is pressuredly movable toward the conveyor belts to thereby maintain a tight spatial relationship between the two opposing belts.

As is thus apparent, two types of vertical movement are provided to components of each of the pre-laminating station, the lamination pressure roller, and the cooling station. Specifically, the belts and roller are vertically movable first to establish and adjust gap height for layers of material to pass, and second to provide pressure against the layers during pre-lamination heating, lamination adhesion, and post-lamination cooling. Because the banks of heater components are pressure driven as described, the pre-lamination conveyor belts remain in a substantially flat position during belt operation and thereby do not experience air gap production and consequent production of temperature inconsistencies within the pre-laminating station. Further, because the lamination pressure roller is tensioned against an aligned conveyor belt guide roller situated beneath the lower conveyor belt, no air gap production occurs immediately preceding the interface of the rollers between which lamination fabric travels since pressure of the pressure roller becomes one with pressure of guide roller of the lower conveyor belt. Finally, because the cooling station is separate, travel between its opposing cooling station conveyor belts is relatively short and consequently promotes taut contact with cooler components and consequent maximization of cooler component capability in readying newly-produced laminated product.

BRIEF DESCRIPTION OF THE SEVERAL VIEWS OF THE DRAWING

An illustrative and presently preferred embodiment of the invention is shown in the accompanying drawings in which.

DETAILED DESCRIPTION OF THE INVENTION

Figure 1:
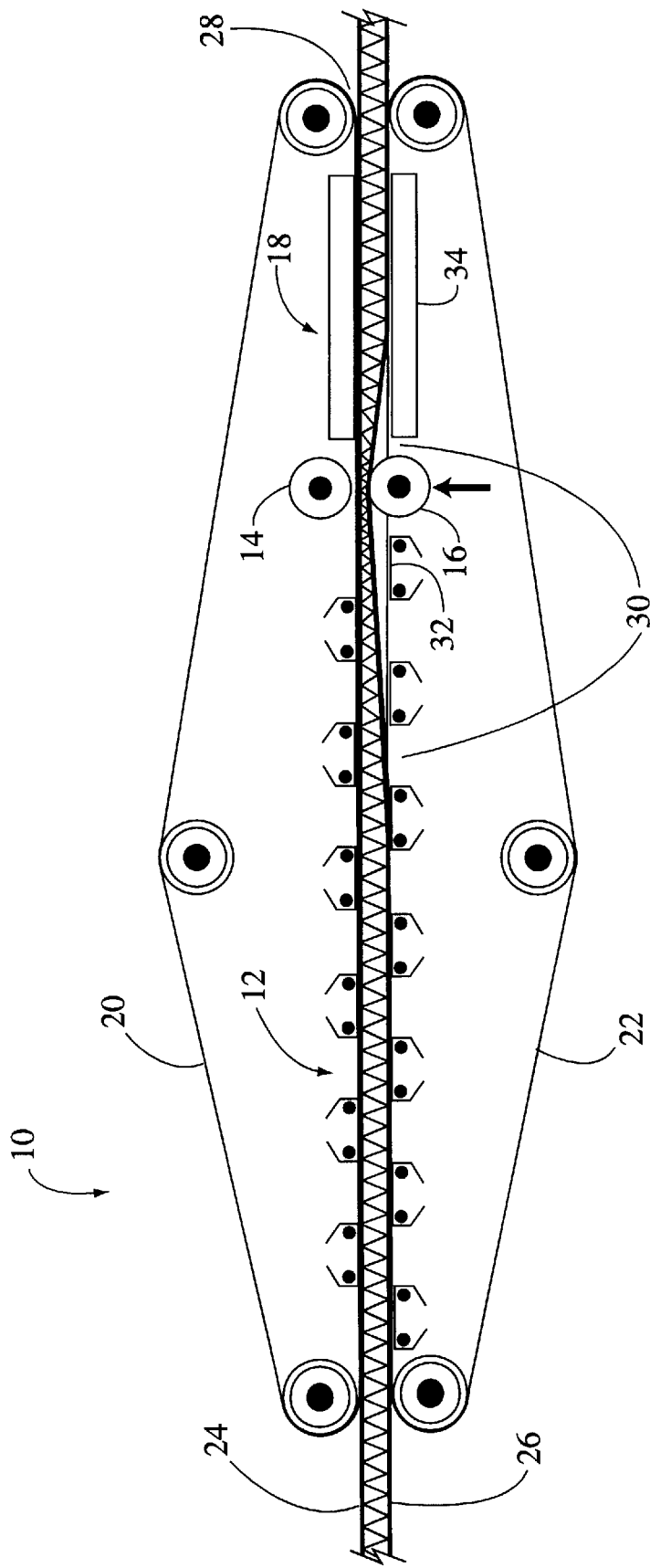
FIG. 1 is a side elevation schematic view of a prior art lamination machine.

Referring first to FIG. 1, a schematic illustration of a prior art lamination machine 10 is illustrated. As there shown, the prior art machine 10 includes a heating zone 12, a pair of opposing lamination rollers 14, 16, and a laminated-product cooling zone 18. A single pair of opposing upper and lower conveyor belts 20, 22 move lengths 24, 26 of material through the heating zone 12, between the lamination rollers 14, 16, and through the cooling zone 18 for final departure from the machine exit 28. Because of the length of the belts 20, 22 and the variation of thicknesses of materials that must be accommodated as occasioned by the lamination rollers 14, 16, an air gap 30 can develop between the lower conveyor belt 22 and heating and cooling elements 32, 34 immediately before and after the lamination rollers 14, 16. This air gap 30 creates an untoward distance between the heating and cooling elements 32, 34 and the material riding on the lower belt 22 which can result in temperature inconsistencies and temperature control difficulties. This undesirable non-precise control of temperature can adversely affect laminar adhesion and thus result in the production of a sub-standard laminated end product.

Figure 2:
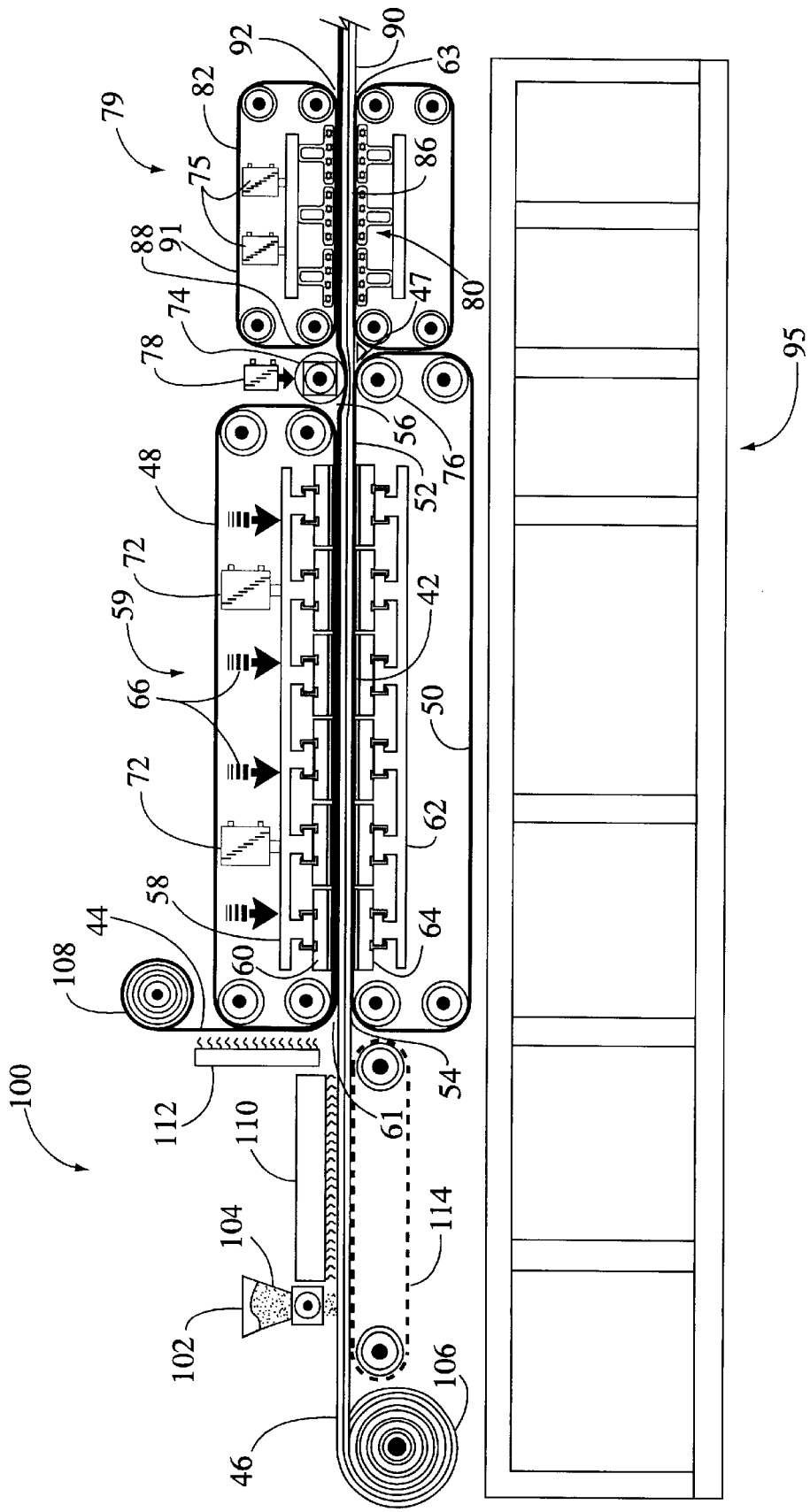
FIG. 2 is a side elevation schematic view of a lamination machine according to the present invention
Figure 3:
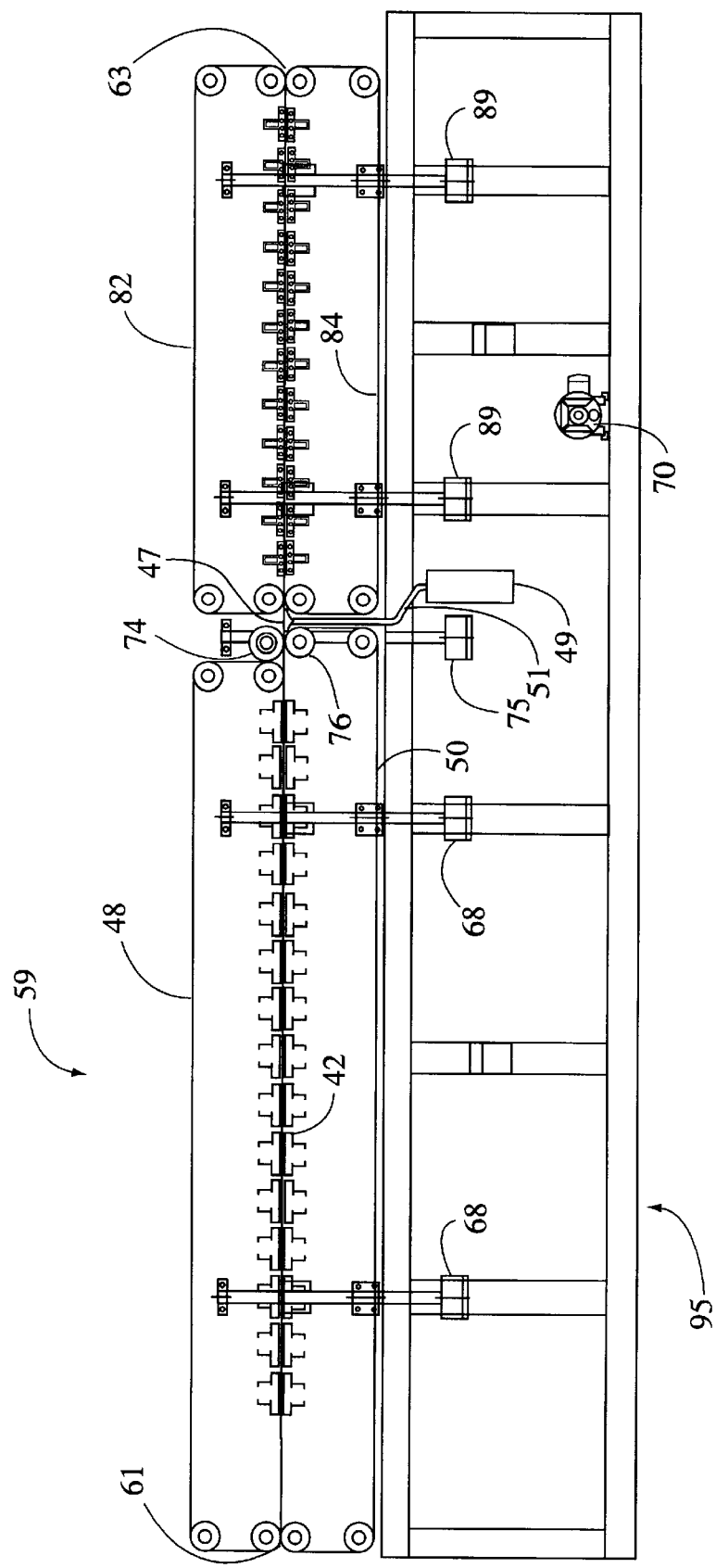
FIG. 3 is a side elevation schematic view in enhanced detail of the lamination machine of FIG. 2.
Figure 4:
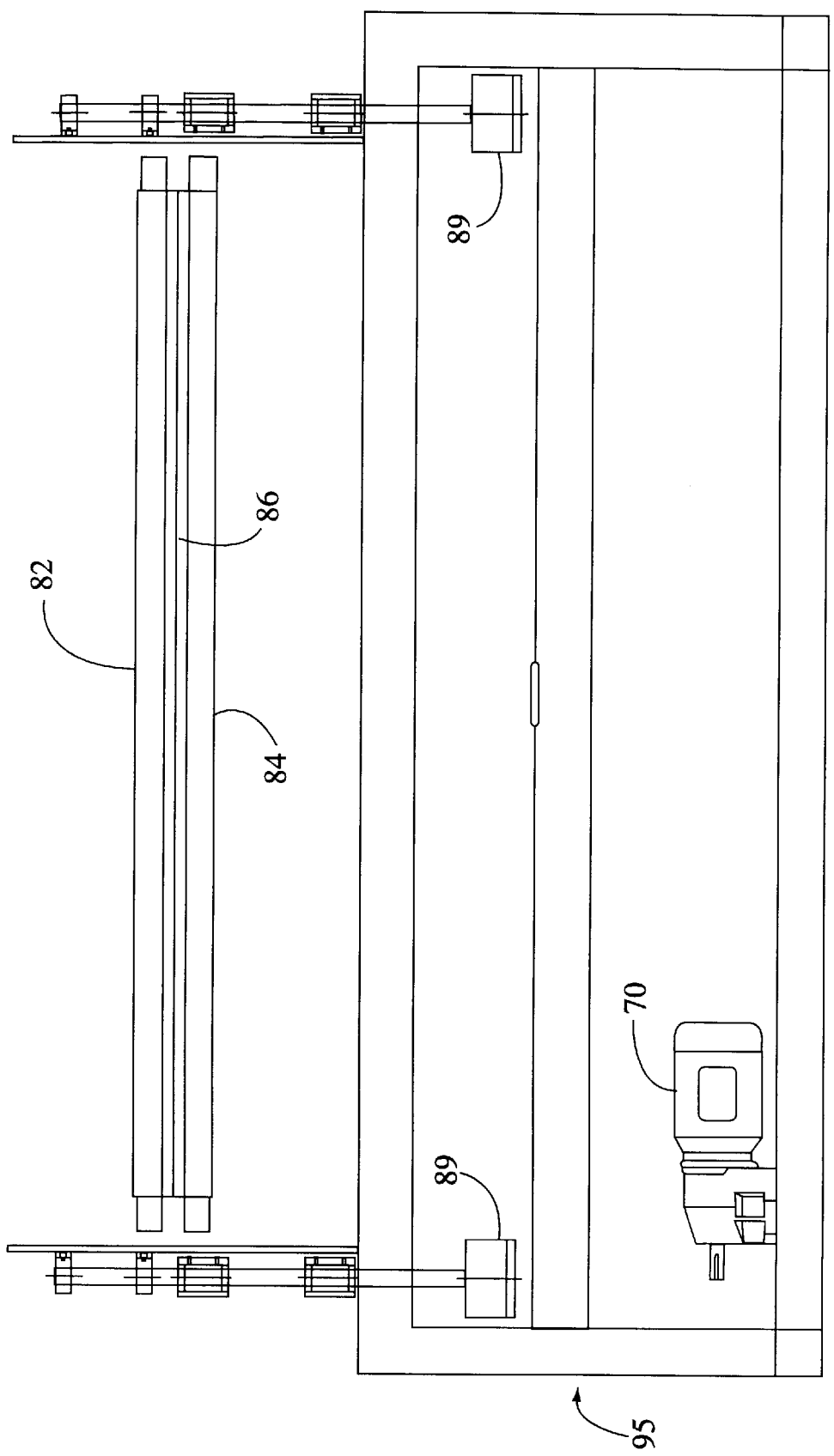
FIG. 4 is an end elevation schematic view in enhanced detail of the lamination machine of FIG. 2.

The lamination machine 40 of the present invention, as shown in FIGS. 2–4, overcomes such temperature variations. As illustrated, the lamination machine 40 provides a flatbed pre-lamination station 42 where two lengths 44, 46 of material, here non-limitedly exemplified as fabric and foam, respectively, are fed for lamination preparation. In particular, the pre-laminating station 42 has upper and lower continuous opposing pre-lamination conveyor belts 48, 50 disposed one above the other to form a lamination passage 52 therebetween having an entrance 54 through which the two lengths 44, 46 of material can travel to a pre-laminating station exit 56. As described later, height of the lamination passage 52 (the gap between the upper and lower conveyor belts 48, 50) is established and adjusted by vertical movement of the upper belt 48 in relation to the lower belt 50.

A bank 58 of upper heating components 60 are positioned immediately above the upper conveyor belt 48, while a bank 62 of lower heating components 64 are positioned immediately below the lower conveyor belt 50. These heating components 60, 64 function to heat heat-sensitive adhesive disposed between the two lengths 44, 46 of material as these lengths travel through the pre-lamination station 42. As illustrated, the lower conveyor belt 50 rides directly upon the lower heating components 64, while the bank 58 of upper heating components 60 is vertically movable as illustrated by arrows 66 to create pressure against the inside of the upper conveyor belt 48 and consequent pressure against layers of material passing within the pre-lamination station 42. As shown in FIG. 2, vertical movement of the bank 58 of upper heating components 60 is accomplished by standard heating-component pneumatic cylinders 72, but can also be accomplished hydraulically or mechanically, as with a scissor jack, as would be recognized. In addition to vertical movement of the bank 58, the entire assembly 59 encompassed by the upper conveyor belt 48 is vertically movable to thereby establish and adjust the height of the gap 61 of the pre-lamination station 42 between the upper and lower conveyor belts 48, 50. As shown in FIG. 3, standard pneumatic cylinders 68 separate from the heating component pneumatic cylinders 72 function to raise and lower the assembly 59 to thereby adjust the gap 61 in accord with the thickness of layers of material passing within the pre-lamination station 42. Once again, it is to be understood, of course, that pneumatically driven movement as described throughout can be replaced by mechanically driven or hydraulically driven movement as would be apparent to the ordinary-skilled artisan. Belt-driven motor 70 functions to conventionally move all conveyor belts.

Immediately downstream from the exit 56 of the pre-lamination station 42 is a lamination pressure roller 74 tensioned against a conveyor belt guide roller 76 situated beneath the lower conveyor belt 50 and in vertical alignment with the pressure roller 74. The entire pressure roller 74 is movable vertically via a pneumatic cylinder 75 to establish and adjust the gap between it and the guide roller 76, while a conventional pneumatic cylinder 78 functions as a roller pressure driver to tension the pressure roller 74 against the guide roller 76 to accomplish laminar bonding. In order to assure unimpeded travel of laminate material into the cooling station 80, a plenum 47 can be situated immediately beyond the roller 74. The plenum 47 has a series of apertures immediately below a laminated layered product 90 passing there over and from which pressurized air generated by a standard air compressor 49 is directed after delivery thereto through a conduit 51 to maintain the product 90 in a direct path into a cooling station 80. In a like manner as with the pre-lamination station 42, the lower conveyor belt 84 of the flatbed cooling station 80 rides directly upon the lower cooler components 94, while the bank 91 of upper cooler components 97 is vertically movable as illustrated by arrows 66 to be movable to a position to create pressure against the inside of the upper conveyor belt 82 and consequent pressure against layers of material passing within the cooling passage 86. As shown in FIG. 2, vertical movement of the bank 95 of upper cooler components 97 is accomplished by standard cooler-component pneumatic cylinders 75. In addition to vertical movement of the bank 95, the entire assembly 79 encompassed by the upper conveyor belt 82 is vertically movable to thereby establish and adjust the height of the gap 63 of the cooling passage 86 between the upper and lower conveyor belts 82, 84. As shown in FIG. 4, standard pneumatic cylinders 89 separate from the cooler-component pneumatic cylinders 75 function to raise and lower the assembly 79 to thereby adjust the gap 63 in accord with the thickness of layers of material passing within the cooling passage 86. Cooling of a laminated layered product 90 prior to its discharge through the exit 92 is thereby accomplished. A standard support structure 95 can be integral with the machine 40 to thereby maintain an appropriately situated work level.

FIG. 2 additionally shows a preparation station 100 immediately upstream from the entrance 54 to the pre-lamination station 42. The preparation station 100 can include an adhesive applicator 102 such as an electrostatic distribution unit 104 for applying lamination adhesive on a lower length of material 46 fed from a roll 106 prior to its coverage by a cooperating upper length 44 likewise fed from a roll 108. One or more heat emitters 110, 112 such as infrared ovens can be provided to for warming of lengths 44, 46 of material prior to entry into the lamination passage 52. As appropriate, a standard support conveyor belt 114 can be included with the preparation station 100 to aid in material movement.

In use, lengths 44, 46 are fed as shown through the preparation station 100 for adhesive application and then into the lamination passage 52 of the pre-lamination station 42 wherein fixed, quantifiable pressure is applied. The two lengths 44, 46 are slowly moved by the upper and lower conveyor belts 48, 50 through the pre-lamination station 42 while being heated by the upper and lower heating components 60, 64. Adequate heat is applied to assure activation of lamination adhesive. The lengths 44, 46 eventually emerge from the exit 56 of the pre-lamination station 42 for immediate movement beneath the pressure roller 74 where actual laminar bonding occurs. Thereafter, the now laminated product 90 enters the flatbed cooling station 80 for cooling and final exit from the exit 92 as a finished end product. As is evident from FIG. 2, the cooperative pressure engagement of the pressure roller 74 with the vertically aligned conveyor belt guide roller 76 accomplishes maintenance of the upper and lower pre-lamination conveyor belts 48, 50 in contact with the upper and lower heating components 60, 64, while the pneumatically controlled upper bank 58 pressured against the upper conveyor belt 48 assures contact of the heating components 60 with the belt 48. The independent upper and lower cooling station conveyor belts 82, 84 of the cooling station 80 cooperate with each other as shown in FIG. 2 to likewise maintain a flatbed configuration. As is therefore evident, both heating and cooling components remain in contact with respective conveyor belts and thus prohibit air gap production therebetween, resulting, of course, in efficient maintenance of desired temperature values throughout both the pre-lamination station 42 and the cooling station 80.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A lamination machine for adhesively heat laminating adjacent surfaces of two lengths of material to each other, the machine comprising:

a) a flatbed pre-laminating station comprising upper and lower continuous opposing pre-lamination conveyor belts disposed one above the other to form a lamination passage therebetween having an entrance through which two lengths of material can enter for continued travel through the lamination passage to a pre-laminating station exit, with at least one of said belts independently vertically movable to establish and adjust height of said lamination passage;

b) a bank of upper heater components positioned immediately above and in contact with the upper pre-lamination conveyor belt and a bank of lower heater components positioned immediately below and in contact with the lower pre-lamination conveyor belt for heating heat-sensitive adhesive disposed between two lengths of material when said lengths travel through the pre-laminating station, with at least one of said bank of upper heater components and said bank of lower heater components pressuredly movable toward the pre-lamination conveyor belts to thereby tightly maintain said belts spatially;

c) a lamination pressure roller situated immediately downstream from the pre-laminating station exit and tensioned against a conveyor belt guide roller situated beneath the lower conveyor belt and in alignment with the lamination pressure roller, said pressure roller pressuredly movable by a roller pressure driver toward the said guide roller and independently vertically movable for establishing and adjusting distance between the pressure roller and guide roller;

d) a flatbed cooling station situated immediately downstream from the pressure roller and comprising upper and lower continuous opposing cooling station conveyor belts disposed one above the other to form a cooling passage therebetween having an entrance through which a laminated product can travel after emergence from beneath the pressure roller for continued travel through the cooling passage to a cooling station exit, with at least one of said belts independently vertically movable to establish and adjust height of said lamination passage; and e) a plurality of respective cooler components positioned immediately above and immediately below the upper and lower cooling station conveyor belts for cooling laminated product subsequent to lamination thereof when said product travels through the cooling zone.

2. A lamination machine as claimed in claim 1 wherein the bank of upper heater components is movable and the bank of lower heater components is stationary.

3. A lamination machine as claimed in claim 1 wherein the at least one bank of heater components is pneumatically pressuredly movable by at least one pneumatic cylinder.

4. A lamination machine as claimed in claim 1 wherein the roller pressure driver is pneumatically powered.

5. A lamination machine as claimed in claim 1 additionally comprising a pre-lamination preparation station disposed substantially immediately upstream from said entrance to the pre-laminating station, said preparation station comprising at least one heat emitter for warming at least one length of material prior to entry of said length into the lamination passage.

6. A lamination machine as claimed in claim 5 wherein the preparation station additionally comprises an adhesive applicator for applying lamination adhesive on a lower length of material prior to an upper length of material covering said lower length.

* * * * *